US007797951B1

(12) United States Patent   (10) Patent No.: US 7,797,951 B1
Patterson   (45) Date of Patent: Sep. 21, 2010

(54) PROCESS AND APPARATUS FOR CHILLING AND SLICING BIOLOGICAL MATERIAL

(75) Inventor: John Patterson, Bellevue, NE (US)

(73) Assignee: DN'S Leasing LLC, Bellevue, NE (US)

(*) Notice: Subject to any disclaimer, the term of this patent is extended or adjusted under 35 U.S.C. 154(b) by 994 days.

(21) Appl. No.: 11/591,052

(22) Filed: Nov. 1, 2006

Related U.S. Application Data

(60) Provisional application No. 60/734,800, filed on Nov. 9, 2005.

(51) Int. Cl.
*F25D 17/02* (2006.01)
(52) U.S. Cl. ............................................. 62/64; 62/373
(58) Field of Classification Search ...................... 62/64, 62/63, 373, 381
See application file for complete search history.

(56) References Cited

U.S. PATENT DOCUMENTS

| 4,796,435 A | 1/1989 | Mattson | ........................ 62/63 |
|---|---|---|---|
| 5,069,923 A * | 12/1991 | Hubbard et al. | ............. 426/445 |
| 5,184,471 A | 2/1993 | Losacco et al. | ................ 62/63 |
| 6,145,616 A * | 11/2000 | Ewanek | ...................... 181/224 |

* cited by examiner

*Primary Examiner*—Melvin Jones
(74) *Attorney, Agent, or Firm*—Suiter Swantz pc llo

(57) ABSTRACT

A chiller apparatus is disclosed. The chiller apparatus comprises a revolving drum, a cooling system, and a baffle assembly. The revolving drum includes a flight assembly that is continuously welded throughout the revolving drum for moving a product from an infeed end of the revolving drum to a discharge end. The cooling system is coupled to the revolving drum for supplying a cooled fluid to the revolving drum. The baffle assembly includes a plurality of triangular baffles seal welded to the inside of the revolving drum and to the flight assembly for turning the product. The seal weld formed between the baffle assembly, the flight assembly, and the revolving drum prevents the cooled fluid from forming stagnation points that contaminate the product.

20 Claims, 10 Drawing Sheets

PROCESS AND APPARATUS FOR CHILLING AND SLICING BIOLOGICAL MATERIAL

CROSS REFERENCE TO RELATED APPLICATIONS

The present application claims the benefit under 35 U.S.C. 119(e) to U.S. Provisional Application Ser. No. 60/734,800 filed Nov. 9, 2005. Said U.S. Provisional Application Ser. No. 60/734,800 filed Nov. 9, 2005 is hereby incorporated by reference in its entirety.

FIELD OF THE INVENTION

The present invention generally relates to the field of meat processing, and more particularly to a process and an apparatus for chilling hides and meats such as beef, pork, fish, turkey, chicken, or the like.

BACKGROUND OF THE INVENTION

Product, such as meats and hides, must be chilled soon after it is slaughtered to prevent microbial contamination. Packing plants run their product through devices known as chillers in response to this risk. A typical chiller includes a revolving drum equipped to move product from a first end to a second end. Flighting, comprising a metal plate or the like, is positioned around the inside diameter of the revolving drum in a helical pattern. As the revolving drum rotates, the flighting moves the product through in a corkscrew type fashion. As the product is moved through the revolving drum, a cooled fluid is passed over the product to absorb heat. At the end of the process, heat is removed from the cooled fluid so that it can be returned back to the revolving drum ready for cooling more product.

There are several problems associated with chillers. For instance, large pieces of product entering the chiller take a longer time to dissipate heat than smaller pieces. As a result, product is typically sliced, ground, or slashed before it is presented to the chiller. The product then must be transferred from the slashing device to the chiller. A conveyor belt may be included in the process for accomplishing this task.

A first side of the product may contact a majority of the cooled fluid rather than a second side. This lengthens the time needed for thorough chilling. Chillers typically use a rectangular flange system to turn the product over while the product is traveling through the chiller. Flanges of the rectangular flange system protrude from the inside diameter of the revolving drum. However, due to the shape and angle of the flanges, product typically stagnates in an area between the angled flange and the inside surface of the revolving drum. This stagnation area can lead to contamination of the product and is difficult to clean.

Further, flighting is used to push the product through the chiller as it rotates, but a gap exists between the flighting and the inside diameter of the revolving drum. A dam-ring flange is positioned toward the discharge end of the chiller to keep a desired amount of cooled fluid inside the chiller. This configuration causes another stagnation point at the point where the flighting meets the dam-ring flange, which makes cleaning the chiller difficult and oftentimes hinders the product's movement through the chiller. Also, the flighting has a rectangular cross-section. Corners of the flighting tend to be sharp and can damage the product while it travels through the chiller.

Chillers are equipped with filters at a discharge end of the revolving drum. Cooled fluid leaves the revolving drum at the discharge end by passing through the filter; however, due to poor construction, pieces of product become lodged in the filter, which causes clogging and traps the cooled fluid in the revolving drum. Chillers also utilize a bearing assembly positioned toward the infeed end of the rotatable drum. This positioning can cause the infeed end to travel upward. To counteract this movement, chillers are being mounted at a decline. Stabilization in all directions is desirable as is a bearing assembly that obviates the need to mount the rotatable drum at an incline.

Product enters the revolving drum at an infeed portal. The cooled fluid also accesses the revolving drum at the infeed portal, which causes an obstruction to the product's movement. Cooled fluid supply pumps are positioned underneath the infeed portal. In this location, the pumps are subjected to falling product and cooled fluid, which damages the pumps and leads to downtime for the chiller. The pumps are also often used as a step for users, which leads to damage.

A cooled fluid source is positioned underneath the revolving drum where access is limited. The cooled fluid source must be accessed periodically for cleaning and maintenance. Make-up water is periodically added to the chiller as the volume of cooled fluid decreases. The make-up water typically is supplied by a local utility line. The make-up water is added to the cooled fluid as the cooled fluid is leaving the cooled fluid source. Because the make-up water has not been cooled, it raises the overall temperature of the cooled fluid as it is added. Consequently, an improved chiller apparatus is necessary.

SUMMARY OF THE INVENTION

The present invention is directed to a chiller apparatus and efficient chiller process. In a first aspect, the chiller apparatus of the present invention includes a revolving drum, a cooling system, and a baffle assembly for turning product, such as meats or hides. The baffle assembly is comprised of a plurality of triangular baffles coupled to an inside diameter of the revolving drum. The baffle assembly is seal welded to the revolving drum. As the drum rotates, product contacts the triangular baffle causing the product to flip over. The result is that the side of the product that was once in contact with the revolving drum is now facing another direction so that it can receive a cooled fluid, such as cooled water. The revolving drum is also equipped with a flight assembly that is continuously welded to the inside diameter of the revolving drum. The flight assembly makes a helical path through the revolving drum and pushes the product through the revolving drum as it rotates. Each baffle of the baffle assembly is welded between two sections of the flight assembly preventing the formation of a gap between the flight assembly and the baffles. The seal weld formed between the baffle assembly, the flight assembly, and the revolving drum prevents the cooled fluid from forming stagnation points that contaminate the product.

In another embodiment of the invention, the chiller apparatus is equipped with a grinder frame. The grinder frame cantilevers a meat grinder from the chiller apparatus. With the meat grinder positioned at the infeed end of the revolving drum, the product is ground and presented to the revolving drum without the need of a conveyor belt or similar transportation device.

A process for absorbing heat from product is further disclosed. The product is first presented to a grinder where the product will be ground or sliced to increase surface area. The product is then presented to a revolving drum and moved through the revolving drum by a continuously welded flight assembly. As the product moves through the revolving drum, a cooled fluid is sprayed onto the product from a pipe assembly that accesses the revolving drum through a discharge end of the revolving drum. The product is flipped over by a seal welded baffle assembly as the revolving drum rotates to ensure that all sides of the product are contacted by the cooled fluid. Once the product reaches the discharge end of the revolving drum, a dewatering screen returns the cooled fluid to a cooling system where heat is absorbed from the cooled fluid so that the cooled fluid can be returned to the revolving drum via the pipe assembly.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
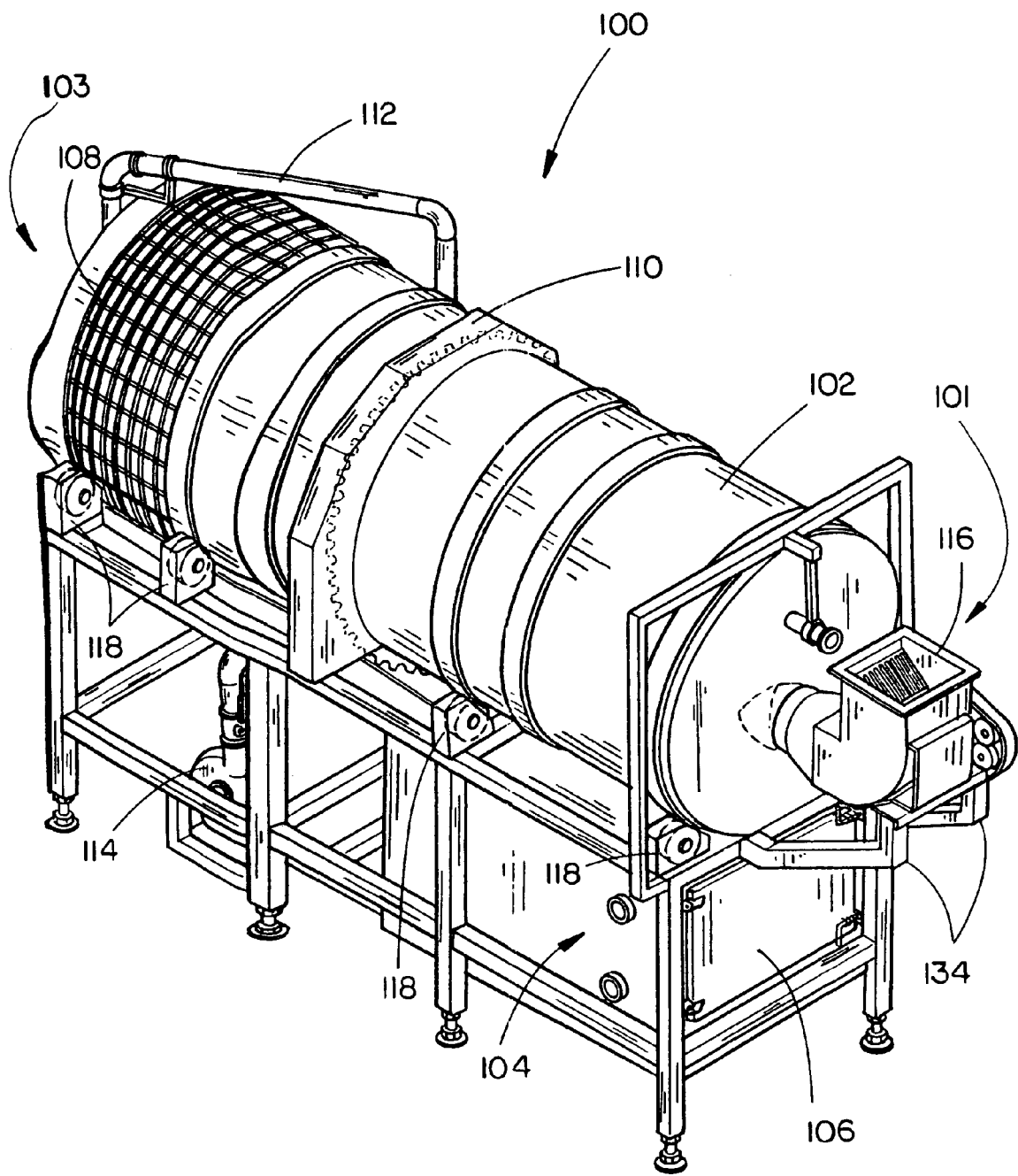
FIG. 1 is an illustration of a chiller apparatus in accordance with an exemplary embodiment of the present invention.

Reference will now be made in detail to the presently preferred embodiments of the invention, examples of which are illustrated in the accompanying drawings.

The present invention is directed to an improved chiller apparatus. Referring to FIGS. 1 through 10, the chiller apparatus 100 of the present invention includes a revolving drum 102 equipped with a baffle assembly 124 for turning a product 200, such as meats or hides. The baffle assembly 124 is comprised of a plurality of triangular baffles coupled to the inside diameter of the revolving drum 102. As the to revolving drum 102 rotates, the product 200 contacts the triangular baffle causing the product 200 to flip over. The result is that the side of the product 200 that was once in contact with the revolving drum 102 is now another direction so that it can receive a cooled fluid 130. The cooled fluid 130 is water in the embodiments illustrated. The cooled fluid 130 may also be brine, glycerol, or the like.

Figure 2:
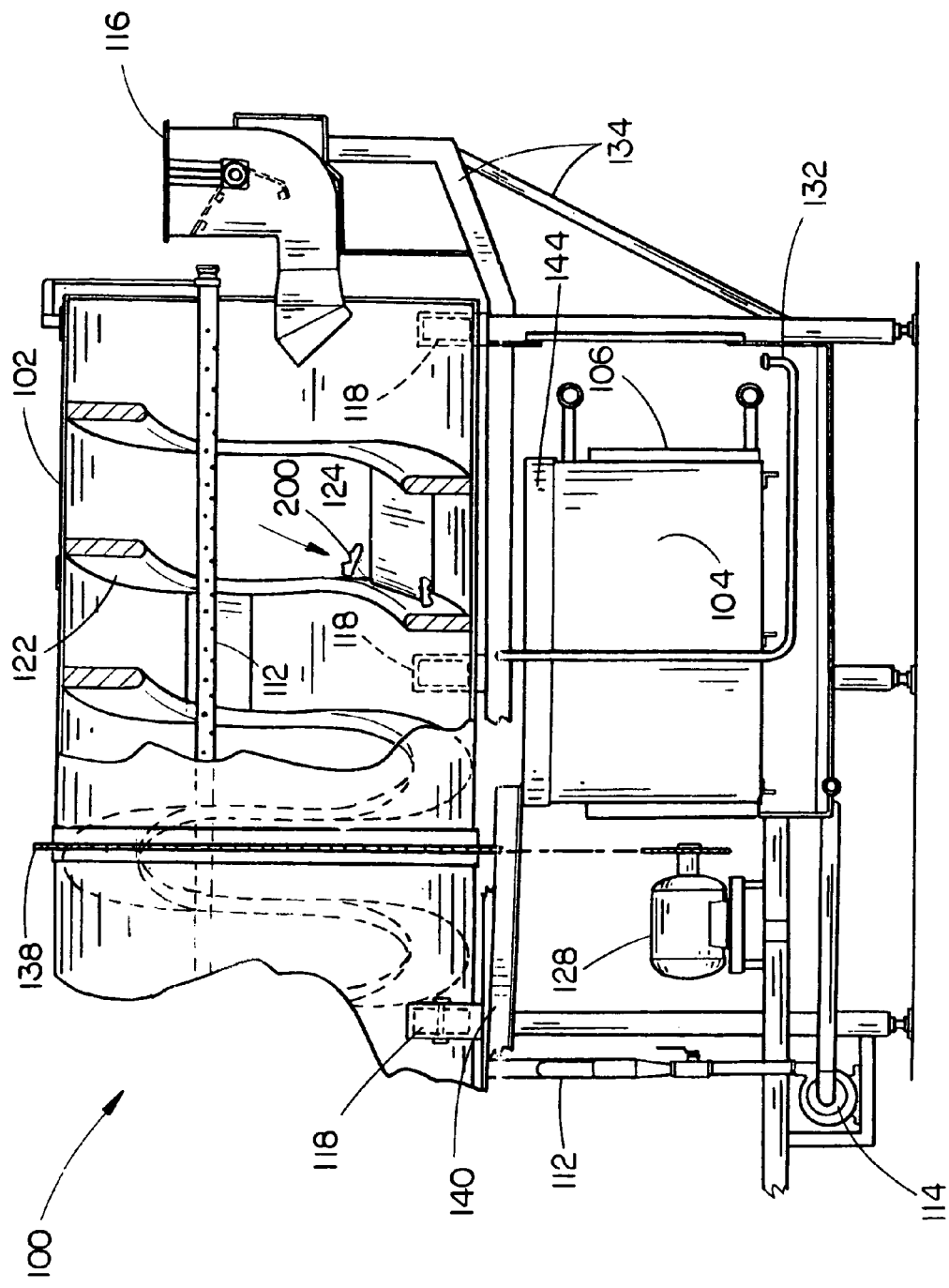
FIG. 2 is a cut-away view of the chiller apparatus illustrating a baffle assembly and a continuously welded flange coupled to the inside of a revolving drum.
Figure 3:
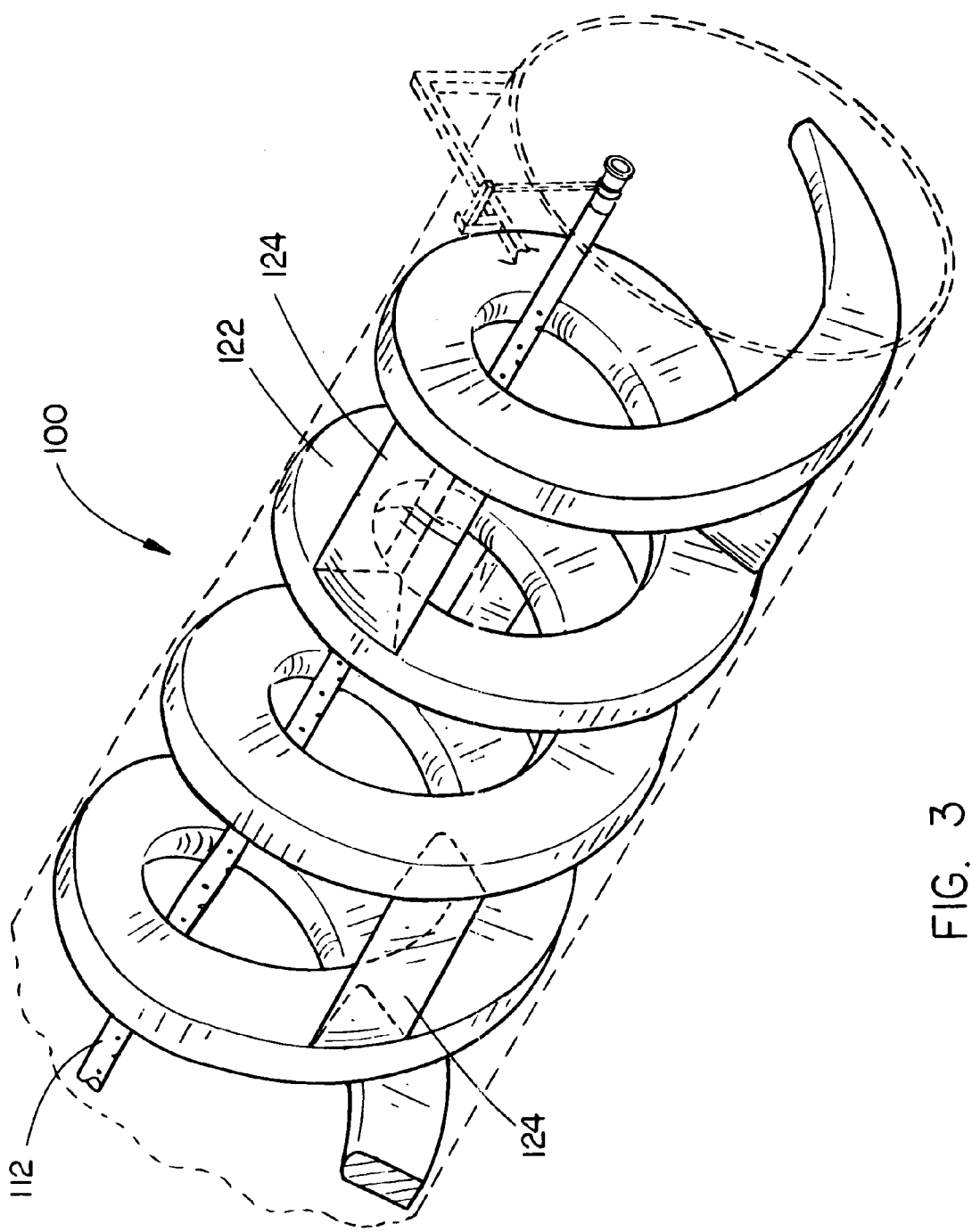
FIG. 3 is an isometric view of the baffle assembly and the continuously welded flange.

Referring now to FIGS. 2 and 3, the chiller apparatus 100 further includes a flight assembly 122. The flight assembly 122 makes a helical path through the revolving drum 102, which enables the revolving drum 102 to push product 200 from the infeed end 101 to the discharge end 103 as the revolving drum 102 rotates. The flight assembly 122 is continuously welded to the inside diameter of the revolving drum 102. There is no space or gap between the flight assembly 122 and the inside diameter of the revolving drum 102. Further, the flight assembly 122 has a contoured profile to prevent the product from tearing as it passes through the revolving drum 102. In the embodiments illustrated in FIGS. 2 and 3, the flight assembly 122 is rounded. A cross-section of the flight assembly 122 appears U-shaped.

The baffle assembly 124 is comprised of a plurality of baffles. Each baffle has a triangular cross-section. Each baffle is also seal welded to both the inside diameter of the revolving drum 102 and between two portions of the flight assembly 122. There is no space or gap between the triangular baffle and the inside diameter of the revolving drum 102. There is no space between the triangular baffle and the corresponding sections of the flight assembly 122 that the baffle is welded. In the embodiments illustrated, a baffle is placed every 120 degrees throughout the helical path of the flight assembly 122. For example, in an embodiment where a first baffle is welded to the flight assembly 122 where the flight assembly 122 begins, a second baffle is placed in a plane parallel to the plane of the first baffle but in a point of the plane that is one hundred and twenty (120) degrees from the first baffle. This configuration staggers the baffles throughout the revolving drum 102, which facilitates proper balancing and vibrational dampening.

Figure 4:
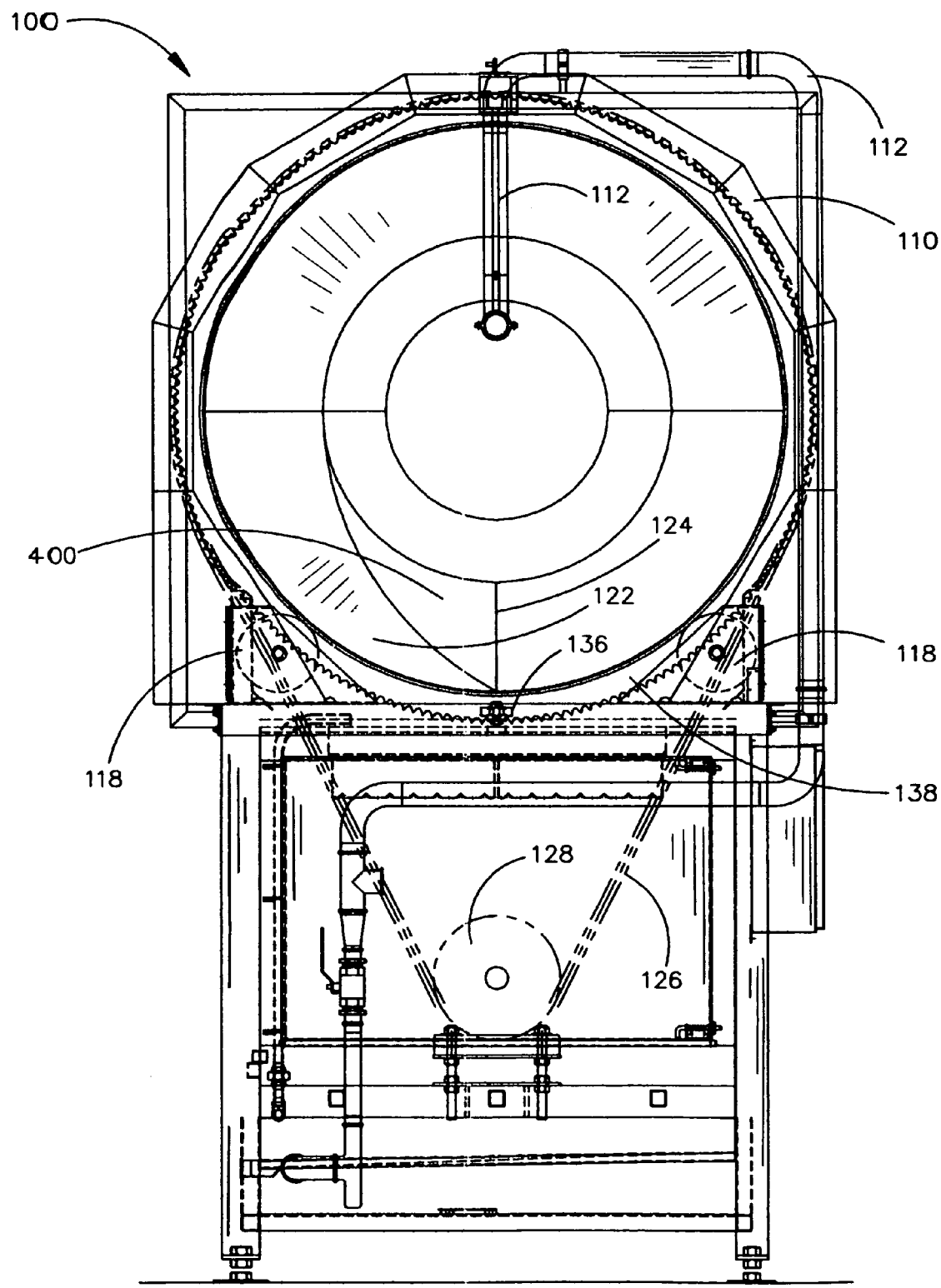
FIG. 4 is a cross-sectional view of the chiller apparatus.
Figure 6:
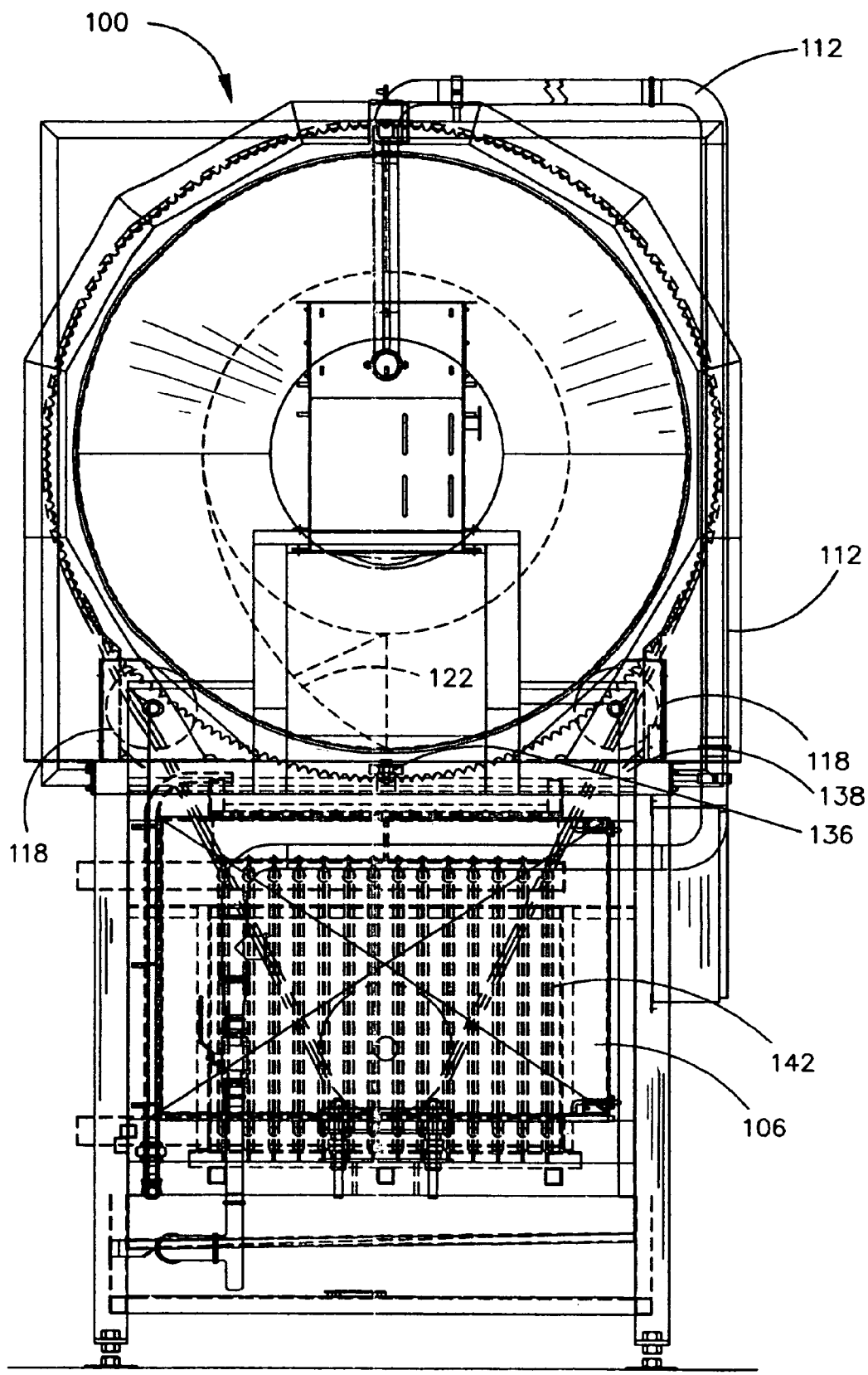
FIG. 6 is a cross-sectional view of the chiller apparatus including a cooling system and a grinder.
Figure 7:
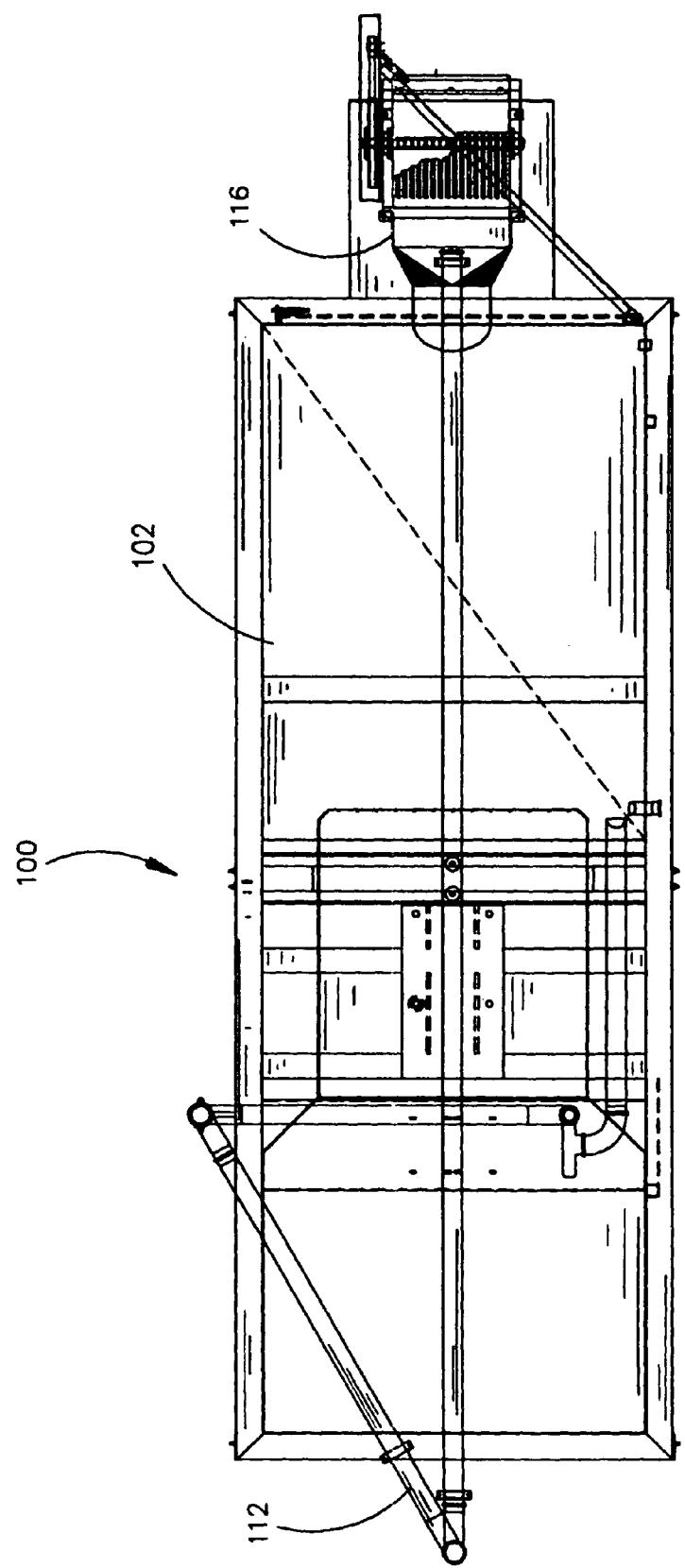
FIG. 7 is a top plan view of the chiller apparatus.

Referring to FIG. 4, in another embodiment of the invention, the chiller apparatus 100 is equipped with a mast bearing assembly 136. The mast bearing assembly 136 is comprised of two opposing mast bearings that surround a sprocket 138 at the bottom dead center position of the sprocket 138. Positioning the mast bearings at the bottom dead center position increases the usable life of the mast bearings due to a reduction in scuffing. A chain guard 110 encompasses the sprocket 138 and a drive train 126, as is shown in FIGS. 4 and 6. In the embodiment illustrated in FIGS. 4 and 6, the drive train 126 is a chain driven by a motor 128 located underneath the revolving drum. In an alternative embodiment, the drive train 126 is a belt. The motor 128 may be an electric motor, an internal combustion engine, or the like. A control panel 120 allows a user to alter the speed of the motor. With this capability, a user can slow the rotational speed of the revolving drum 120 so that more heat is absorbed from the product 200.

The chiller apparatus 100 is further stabilized by a caster assembly 118, which is illustrated in FIG. 1. The caster assembly 118 is comprised of four pairs of casters. Each caster from a pair is positioned on the opposite side of the revolving drum 102 from the other caster. This configuration provides lateral stability to the chiller apparatus and facilitates a smooth rotation of the revolving drum 102.

Figure 5:
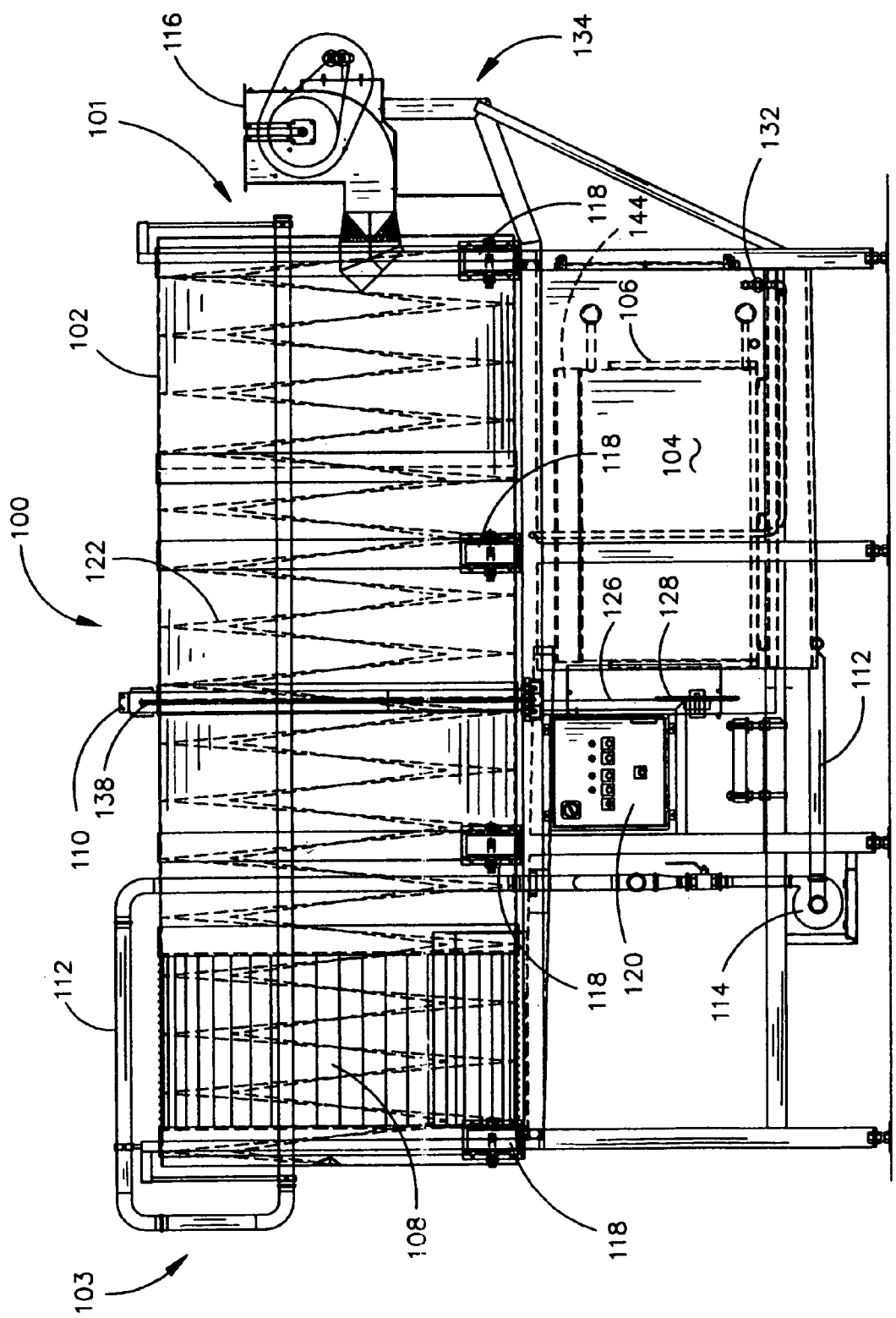
FIG. 5 is a side view of the chiller apparatus illustrating a dewatering screen positioned at a discharge end of the chiller apparatus.
Figure 8:
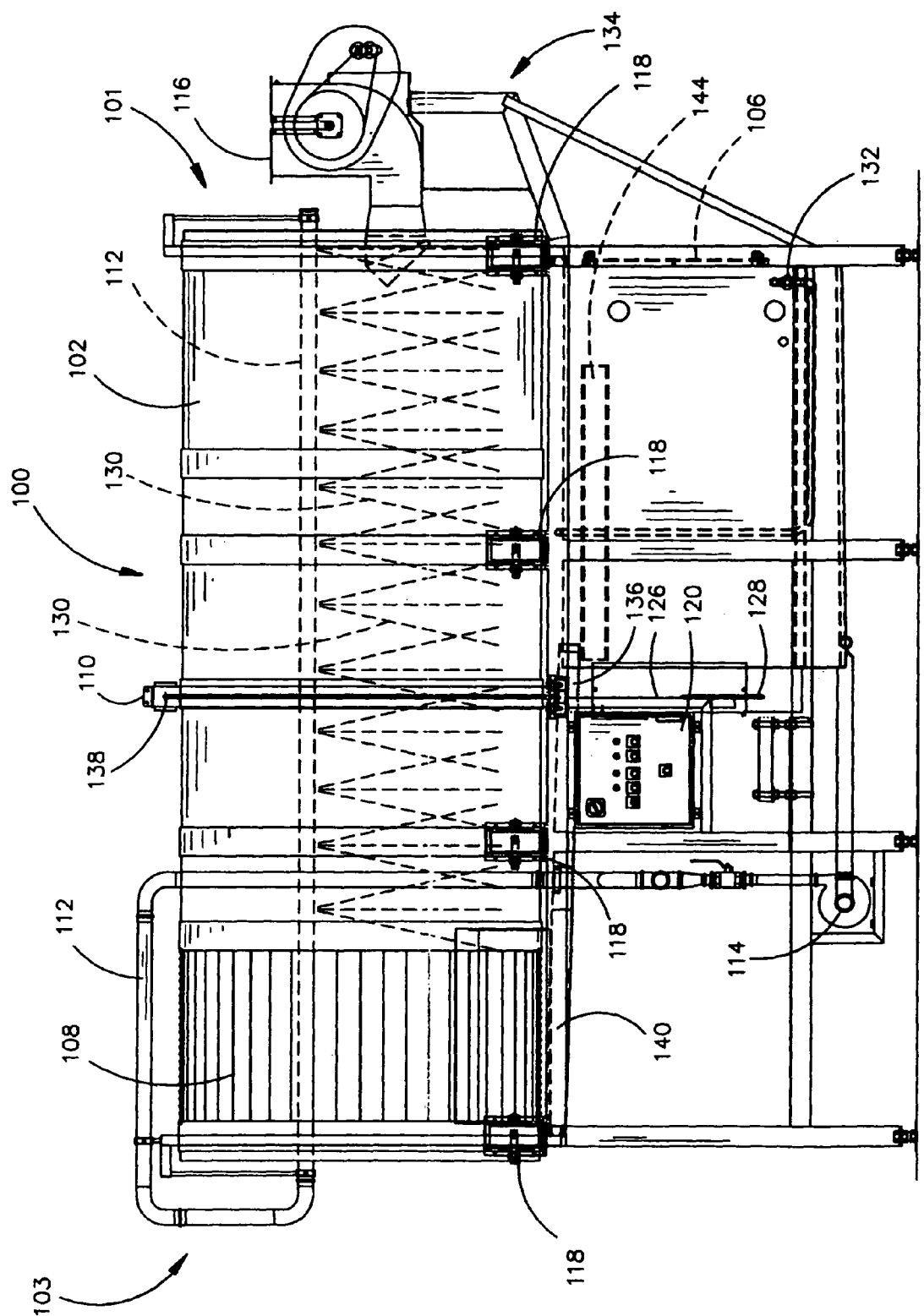
FIG. 8 is a side view of the chiller apparatus illustrating a pipe assembly dispersing cooled fluid through the revolving drum.
Figure 9:
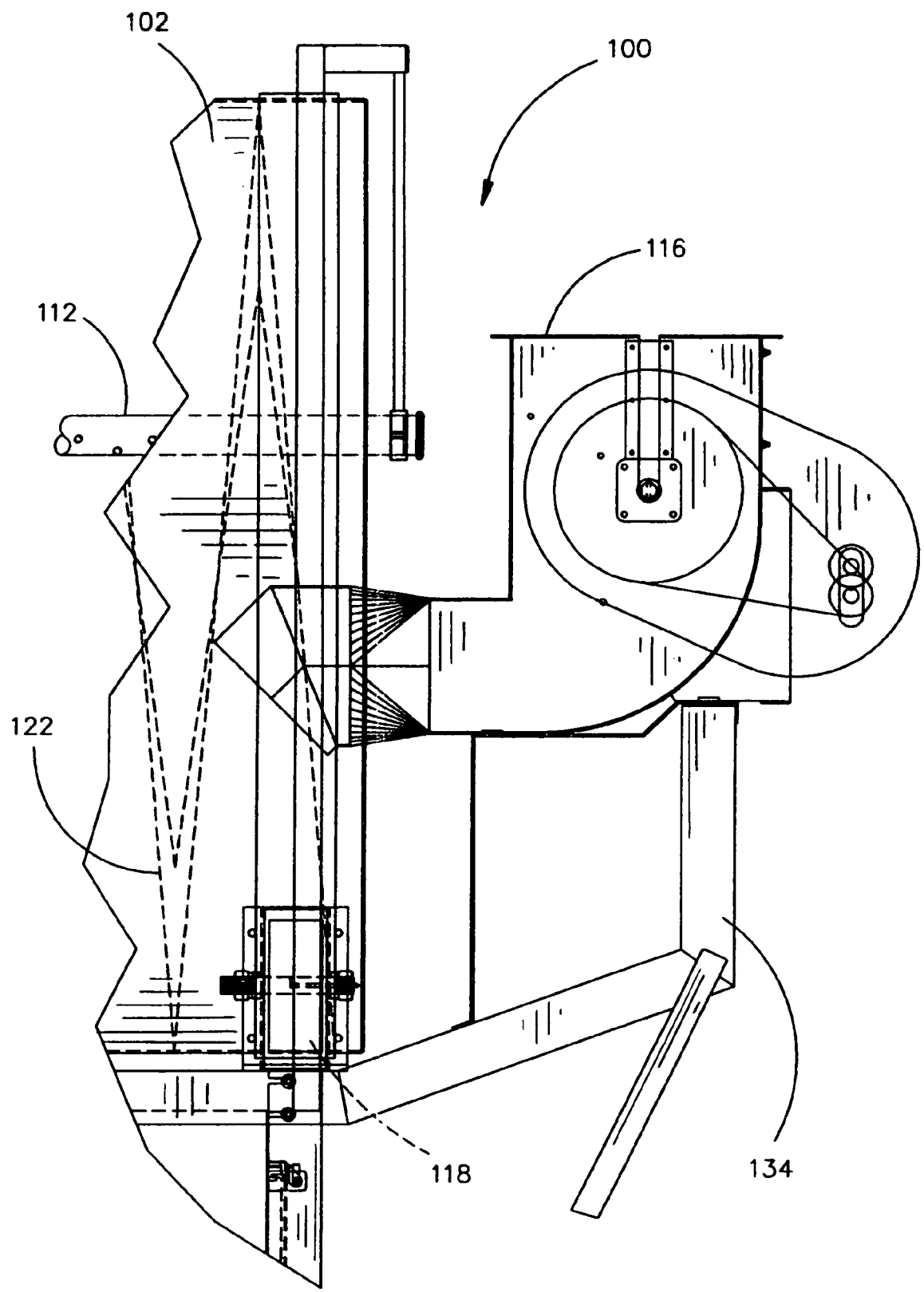
FIG. 9 is a side view of the grinder illustrated in FIG. 6.
Figure 10:
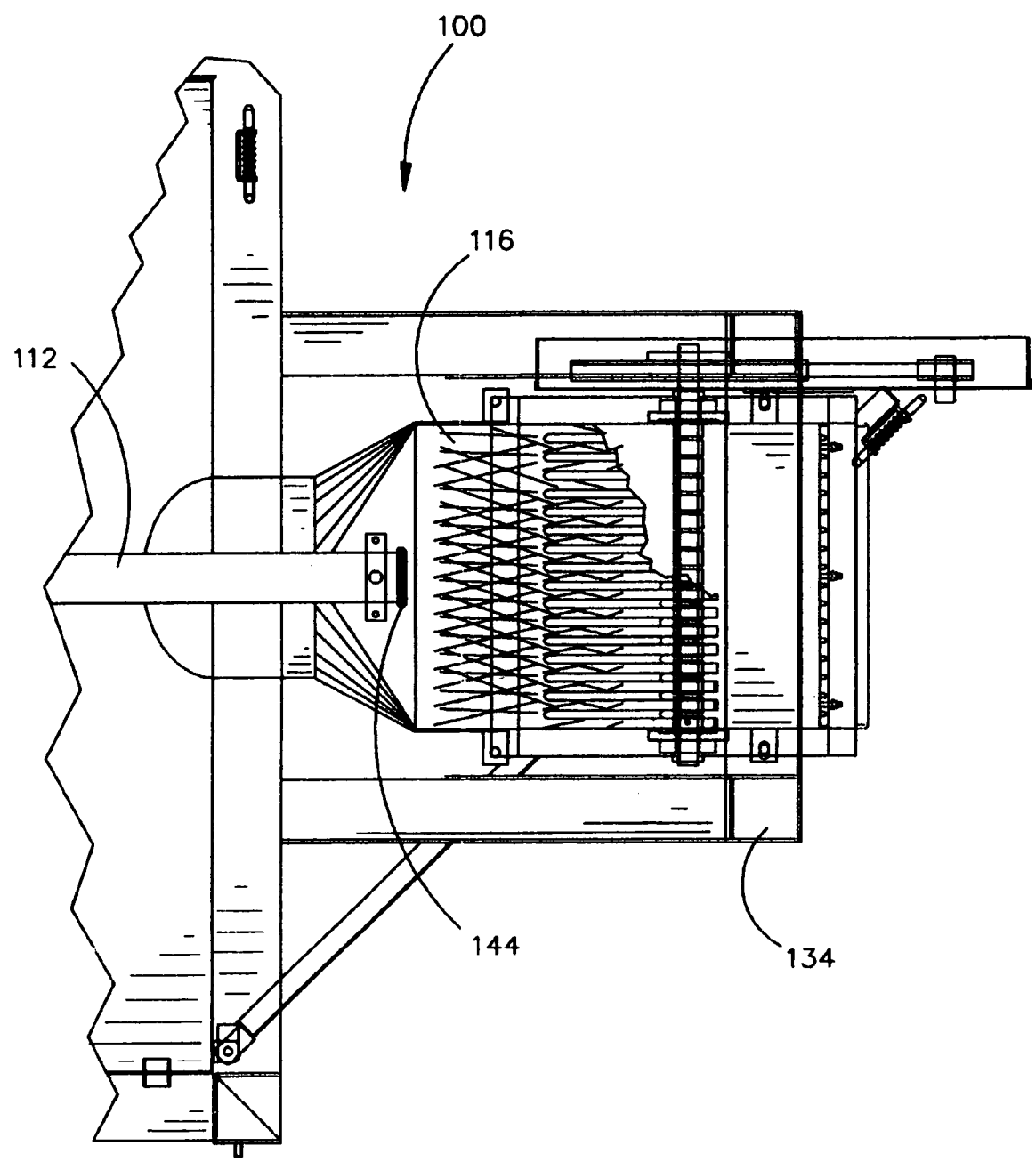
FIG. 10 is an overhead view of the grinder in accordance with an exemplary embodiment of the present invention.

As illustrated in the embodiments shown in FIGS. 1, 5, and 8, the chiller apparatus 100 also includes a dewatering screen 108. The dewatering screen 108 is located at the discharge end 103 of the revolving drum 102. After the product 200 has been sufficiently chilled, the product 200 and the cooled fluid 130 are presented to the dewatering screen 108. The dewatering screen 108 allows the cooled fluid 130 to fall through to a return water flume 140 while the product 200 continues moving down the revolving drum 102. The return water flume 140 is inclined and allows cooled fluid 130 to fall into a water distribution pan 144 of a cooling system 104. The dewatering screen 108 is comprised of v-wire in the embodiment illustrated in FIGS. 1, 5, and 8. In the illustrated embodiment, the v-wire is GATOR WIRE®. In another embodiment, the v-wire is wedge wire. The v-wire prevents pieces of product 200 from clogging the dewatering screen 108.

The v-wire is reinforced with tie wire, which is placed circumferentially with respect to the revolving drum 102 around the v-wire. Because the v-wire runs linearly with the centerline of the revolving drum 102, the v-wire and tie wire form a grid. In the embodiments illustrated, the center of each piece of tie wire is placed 1.5 (one and one-half) inches from the center of the neighboring piece of tie wire.

In the embodiment illustrated in FIGS. 1 through 10, the chiller apparatus 100 includes a pipe assembly 112. The pipe assembly 112 transports cooled fluid 130 from a cooling system 104 to the revolving drum 102. The pipe assembly 112 accesses the revolving drum 102 through the discharge end 103 of the revolving drum 102. When the pipe assembly 112 accesses the revolving drum 102 through the discharge end 103, it prevents an obstruction to the movement of product. The portion of the pipe assembly 112 that is encompassed by the revolving drum 102 is equipped with a system of ports. The system of ports allows cooled fluid 130 to be sprayed onto the product 200, as is illustrated in FIG. 8. In the embodiment illustrated in FIG. 10, the pipe assembly 112 includes a spout 144 protruding from the infeed end of the revolving drum 102 for supplying cooled fluid 130 to a meat grinder 116.

The meat grinder is supported by a grinder frame 134 coupled to the infeed end 101 of the chiller apparatus 100. The grinder frame 134 cantilevers the meat grinder 116 from the chiller apparatus. In the embodiments illustrated in FIGS. 1-10, the grinder frame 134 is a plurality of metal posts welded to the chiller apparatus.

The meat grinder 116 is positioned at the infeed end of the revolving drum 102 and cuts or grinds the product 200 before it enters. This creates more surface area that will contact the cooled fluid 130, which reduces the time needed to absorb the appropriate amount of heat from the product 200. The meat grinder 116 is powered by an electric motor in the embodiment illustrated. In an alternative embodiment, the meat grinder 116 is belt-driven and powered by the motor 128.

The cooling system 104 of the chiller apparatus 100 is equipped with a watertight access door 106. The watertight access door 106 is hinged to the cooling system 104, and allows a user to gain entry with more ease, especially for cleaning and maintenance of the cooled fluid reservoir. The cooling system 104 is comprised of a heat exchanger encompassed by a cool water reservoir. In the exemplary embodiments, the heat exchanger includes chill plates 142 that are charged with ammonia. The chiller apparatus 100 illustrated in FIGS. 1 through 10 has a seventy-two inch (72) diameter and fourteen (14) chill plates. The return water flume 140 presents fluid to be cooled to the cool water reservoir where the ammonia charged heat exchanger extracts heat from the fluid. The cooled fluid 130 will then be returned to the revolving drum 102 for absorbing more heat from the product 200.

As the chiller apparatus 100 operates, the volume of cooled fluid 130 decreases. A make-up water line 132 is coupled to the cooling system 104 to restore lost fluid. The make-up water line 132 supplies water from a utility source to a water distribution pan 144 of the cooling system 104. The make-up water is then cascaded over the chill plates 142 of the heat exchanger with the rest of the cooled fluid 130. The cools the temperature of the make-up water which improves the efficiency of the chiller apparatus 100.

A supply pump 114 is positioned underneath the discharge end 103 of the revolving drum 102 for pumping the cooled fluid 130. This positioning provides user-friendly access for supply pump maintenance while protecting the pump from inadvertent damage. This positioning also prevents product 200 and cooled fluid 130 from inadvertently falling on top of the supply pump 114, which can cause damage. In the embodiment illustrated in FIGS. 1, and 3 through 8, the supply pump 114 is a centrifugal pump.

A process for absorbing heat from a product 200 is also disclosed. The product 200 is first presented to a grinder 116 where the product will be ground or sliced to increase surface area. The product 200 is then presented to a revolving drum 102. Once inside the revolving drum 102, the product 200 is moved through the revolving drum 102 by a continuously welded flight assembly 122. As the product 200 moves through the revolving drum 102, a cooled fluid 130 is sprayed onto the product from a pipe assembly 112. The product 200 is flipped over by a baffle assembly 124 that is seal welded to the revolving drum 102 and the flight assembly 122. Once the product 200 reaches a discharge end of the revolving drum 102, a dewatering screen 108 returns the cooled fluid 130 to a cooling system 104 where heat is absorbed from the cooled fluid 130 so that the cooled fluid 130 can be returned to the revolving drum 102 via the pipe assembly 112.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A chiller apparatus comprising:
    a revolving drum including a flight assembly that mounted throughout the revolving drum for moving a product from an infeed end of the revolving drum to a discharge end;
    a cooling system coupled to the revolving drum for supplying a cooled fluid to the revolving drum;
    a baffle assembly including a plurality of triangular baffles coupled to an inside of the revolving drum and to the flight assembly for turning the product; and
    a mast bearing assembly for stabilizing a sprocket that surrounds a middle portion of the revolving drum, the mast bearing assembly including a first mast bearing and an opposing second mast bearing positioned at a bottom dead center location of the sprocket,
    wherein the baffle assembly, the flight assembly, and the revolving drum prevent the cooled fluid from forming stagnation points that contaminate the product.

2. The chiller apparatus disclosed in claim 1, further comprising a dewatering screen that includes v-wire and surrounds the discharge end of the revolving drum for returning the cooled fluid to the cooling system.

3. The chiller apparatus disclosed in claim 1, further comprising a pipe assembly for transporting the cooled fluid from the cooling system to the discharge end of the revolving drum and throughout the revolving drum.

4. The chiller apparatus disclosed in claim 3, further comprising a spout protruding from the infeed end of the revolving drum for supplying the cooled fluid to the grinder.

5. The chiller apparatus disclosed in claim 3, further comprising a coolant supply pump positioned underneath the discharge end of the revolving drum and coupled to the pipe assembly for pumping the cooled fluid throughout the chiller apparatus.

6. The chiller apparatus disclosed in claim 1, further comprising a make-up water system for supplying water to a water distribution pan of the cooling system.

7. A chiller apparatus comprising:
a revolving drum including a flight assembly mounted throughout the revolving drum for moving a product from an infeed end of the revolving drum to a discharge end;
a cooling system coupled to the revolving drum for supplying a cooled fluid to the revolving drum;
a baffle assembly including a plurality of triangular baffles seal welded to an inside of the revolving drum and to the flight assembly for turning the product; and
a grinder frame for cantilevering a grinder from the infeed end of the revolving drum,
wherein the grinder slices or cuts the product before the product enters the revolving drum.

8. The chiller apparatus disclosed in claim 7, further comprising a mast bearing assembly for stabilizing a sprocket that surrounds a middle portion of the revolving drum, the mast bearing assembly including a first mast bearing and an opposing second mast bearing positioned at a bottom dead center location of the sprocket.

9. The chiller apparatus disclosed in claim 7, further comprising a dewatering screen that includes v-wire and surrounds the discharge end of the revolving drum for returning the cooled fluid to the cooling system.

10. The chiller apparatus disclosed in claim 7, further comprising a pipe assembly for transporting the cooled fluid from the cooling system to the discharge end of the revolving drum and throughout the revolving drum.

11. The chiller apparatus disclosed in claim 10, further comprising a spout protruding from the infeed end of the revolving drum for supplying the cooled fluid to the grinder.

12. The chiller apparatus disclosed in claim 10, further comprising a coolant supply pump positioned underneath the discharge end of the revolving drum and coupled to the pipe assembly for pumping the cooled fluid throughout the chiller apparatus.

13. A process for absorbing heat from a product comprising:
moving a product from an infeed end to a discharge end of the revolving drum via a flight assembly that is mounted to the revolving drum;
cooling the product as the product moves through the revolving drum by supplying a cooled fluid to the revolving drum;
supplying the cooled fluid to the grinder to absorb heat from the grinder and to lubricate the grinder; and
turning the product as it moves through the revolving drum by contacting the product with a baffle assembly that is seal welded to the revolving drum and the flight assembly,
wherein the baffle assembly, the flight assembly, and the revolving drum prevent the cooled fluid from forming stagnation points that contaminate the product.

14. The process for absorbing heat disclosed in claim 13, further comprising presenting the product to a grinder that is coupled to the infeed end of the revolving drum.

15. The process for absorbing heat disclosed in claim 13, further comprising presenting the product to a dewatering screen that includes v-wire for returning the cooled fluid to a cooling system.

16. The process for absorbing heat disclosed in claim 13, further comprising passing the cooled fluid through a pipe assembly that transports the cooled fluid from a cooling system to the discharge end of the revolving drum and then throughout the revolving drum.

17. The process for absorbing heat disclosed in claim 16, further comprising pressurizing the cooled fluid with a coolant supply pump which is positioned underneath the discharge end of the revolving drum.

18. The process for absorbing heat disclosed in claim 16, further comprising supplying make-up water from a utility source to the cooling system to be cooled with the cooled fluid.

19. A chiller apparatus comprising:
a revolving drum including a flight assembly that mounted throughout the revolving drum for moving a product from an infeed end of the revolving drum to a discharge end;
a cooling system coupled to the revolving drum for supplying a cooled fluid to the revolving drum;
a baffle assembly including a plurality of triangular baffles coupled to an inside of the revolving drum and to the flight assembly for turning the product; and
a make-up water system for supplying water to a water distribution pan of the cooling system, wherein the baffle assembly, the flight assembly, and the revolving drum prevent the cooled fluid from forming stagnation points that contaminate the product.

20. A process for absorbing heat from a product comprising:
moving a product from an infeed end to a discharge end of the revolving drum via a flight assembly that is mounted to the revolving drum;
cooling the product as the product moves through the revolving drum by supplying a cooled fluid to the revolving drum;
passing the cooled fluid through a pipe assembly that transports the cooled fluid from a cooling system to the discharge end of the revolving drum and then throughout the revolving drum;
supplying make-up water from a utility source to the cooling system to be cooled with the cooled fluid;
turning the product as it moves through the revolving drum by contacting the product with a baffle assembly that is seal welded to the revolving drum and the flight assembly, wherein the baffle assembly, the flight assembly, and the revolving drum prevent the cooled fluid from forming stagnation points that contaminate the product.

* * * * *